United States Patent
Moon et al.

(10) Patent No.: US 7,313,400 B2
(45) Date of Patent: Dec. 25, 2007

(54) RADIO COMMUNICATION DEVICE AND METHOD THEREOF

(75) Inventors: Sung Uk Moon, Yokosuka (JP); Toshiyuki Futakata, Yokosuka (JP); Tomohiro Dohi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 767 days.

(21) Appl. No.: 10/428,759

(22) Filed: May 5, 2003

(65) Prior Publication Data

US 2003/0211851 A1    Nov. 13, 2003

(30) Foreign Application Priority Data

May 10, 2002    (JP)    ............... 2002-136064

(51) Int. Cl.
*H04Q 7/20* (2006.01)
*H04B 7/216* (2006.01)

(52) U.S. Cl. ............ 455/450; 455/452.2; 370/335; 370/342

(58) Field of Classification Search ............ 455/450, 455/452.2; 370/335, 342
See application file for complete search history.

(56) References Cited

U.S. PATENT DOCUMENTS

| | | | |
|---|---|---|---|
| 6,567,374 B1 * | 5/2003 | Bohnke et al. | ............ 370/203 |
| 6,888,789 B1 * | 5/2005 | Sakoda et al. | ............ 370/208 |
| 7,039,001 B2 * | 5/2006 | Krishnan et al. | ............ 370/203 |
| 7,158,770 B2 * | 1/2007 | Hanaoka et al. | ............ 455/226.1 |
| 7,164,649 B2 * | 1/2007 | Walton et al. | ............ 370/203 |
| 7,184,495 B2 * | 2/2007 | Thomson et al. | ............ 375/340 |
| 2003/0013415 A1 * | 1/2003 | Shoji et al. | ............ 455/67.3 |
| 2004/0252629 A1 * | 12/2004 | Hasegawa et al. | ............ 370/208 |

FOREIGN PATENT DOCUMENTS

| | | |
|---|---|---|
| EP | 1 083 719 A2 | 3/2001 |
| GB | 2 320 872 A | 7/1998 |
| JP | 2001-339363 | 12/2001 |

OTHER PUBLICATIONS

Fredrik Tufvesson, et al., "Pilot Assisted Channel Estimation for OFDM in Mobile Cellular Systems", IEEE, XP10229045A, vol. 3, May 4, 1997, pp. 1639-1643.

* cited by examiner

*Primary Examiner*—Barry Taylor
(74) *Attorney, Agent, or Firm*—Oblon, Spivak, McClelland, Maier & Neustadt, P.C.

(57) ABSTRACT

There is provided a radio communication device able to adaptively adjust a pilot symbol insertion rate and improve efficiency of channel estimation and data transmission. It comprises a channel estimation unit that performs the channel estimation using the pilot symbols, a storage unit that stores a plurality of estimated values obtained by the channel estimation unit, a determination unit that compares the estimated values stored in the storage unit and determines an amount of change of the estimated values, and a notification unit that notifies the pilot symbol insertion unit of the amount of change of the estimated values.

9 Claims, 8 Drawing Sheets

RADIO COMMUNICATION DEVICE AND METHOD THEREOF

BACKGROUND OF THE INVENTION

1. Field of the Invention

The present invention generally relates to a radio communication device and a method thereof for channel estimation, in particular, to a radio communication device and a method thereof able to adjust a pilot symbol insertion rate in channel estimation.

2. Description of the Related Art

Generally, coherent detection and differential detection are used for demodulation in digital mobile communications. In coherent detection, a received signal is detected using a reference waveform generated by a carrier recovery circuit, so the coherent detection shows good performance on bit error rate in an additive white Gaussian noise channel. On the other hand, in differential detection, instead of using a reference waveform, a signal received one or more symbols earlier is detected to obtain a phase difference, so, differential coding is necessary on the transmitting end. In addition, in the differential detection, noise is introduced also to the reference signal, therefore the bit error rate due to the additive white Gaussian noise is increased compared with that in the coherent detection. Further, the necessary information only comes from the phase difference before and after the bit sequence generated by the differential coding. As a result, although channel estimation becomes unnecessary, the quality of the received signal is worse than that in the coherent detection by 3 dB.

In a W-CDMA system, coherent rake reception is adopted since it is superior in quality of the received signal. In the coherent rake reception, channel estimation (estimation of amplitude variation and phase variation in the transmission channels) is one of the important techniques that largely affect the quality of the received signals. In the W-CDMA system, channel estimation is performed by using pilot symbols of known patterns inserted into a frame at a constant rate by means of time multiplexing. Various kinds of methods have been proposed to perform channel estimation using the pilot symbols. Below, WMSA (Weighted Multi-Slot Averaging) channel estimation is described.

Figure 1:
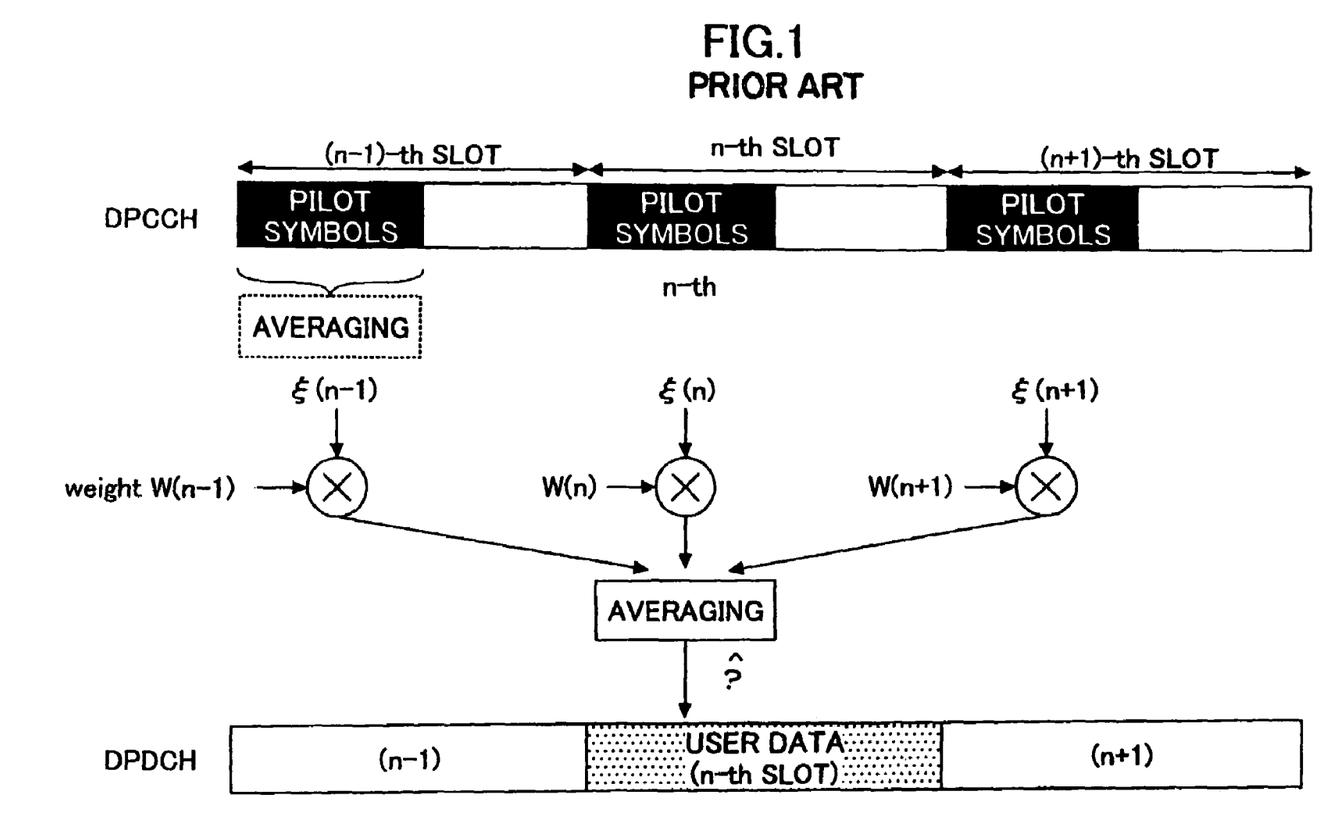
FIG. 1 is a view for explaining a principle of WMSA channel estimation.

FIG. 1 shows the principle of the WMSA channel estimation. Here, explanation is made about channel estimation of the n-th slot. As shown in FIG. 1, first, the modulated pilot symbols are removed from the n-th slot and those before and after the nth slot, or only from the n-th slot (in FIG. 1, the (n−1)-th slot, the n-th slot, and the (n+1)-th slot are considered). Then average is made ($\xi$ (n−1), $\xi$ (n) and $\xi$ (n+1)) in each of these slots, and as a result, the instantaneous channel estimation of the n-th slot is obtained. Here, by averaging channel estimations of multiple slots, the precision of channel estimation against thermal noise and power interference is improvable. However, when fading changes rapidly, the obtained channel estimation is related to a slot at a time far from the n-slot (that is, a slot having low correlation), and fading tracking becomes difficult. So, appropriate weight factors are applied to ensure the precision against thermal noise (and interference power) and ease of fading tracking. So far, there have been proposed various kinds of methods for applying weight factors, for example, there is a method of adaptively controlling the average weight factor so that the SIRs of the received signals reach the maximum, a method of switching the weight factor for use within a number of weight factors, and a method of detecting the speed of fading evolution and switching the weight factor for use.

When the propagation environment changes slowly, the change of the channel estimation over multiple slots becomes small. However, in methods of channel estimation of the related art, the pilot symbols are transmitted at fixed intervals, so even when the change of the channel estimation is small and hence many pilot symbols are not necessary, pilot symbols are still transmitted very frequently, and consequently, there arises a problem in that the data are repeatedly transmitted.

SUMMARY OF THE INVENTION

Accordingly, it is a general object of the present invention to solve the above problems of the related art.

A more specific object of the present invention is to provide a radio communication device and a method thereof able to adaptively adjust a pilot symbol insertion rate and improve efficiency of channel estimation and data transmission.

To attain the above object, according to a first aspect of the present invention, there is provided a radio communication device that performs channel estimation more than once using a plurality of pilot symbols inserted at predetermined intervals by a pilot symbol insertion unit into a received data sequence, comprising a channel estimation unit configured to perform the channel estimation using the pilot symbols, a storage unit configured to store a plurality of estimated values obtained by the channel estimation unit, a determination unit configured to compare the estimated values stored in the storage unit and determine an amount of change of the estimated values, and a notification unit configured to notify the pilot symbol insertion unit of the amount of change of the estimated values.

To attain the above object, according to a second aspect of the present invention, there is provided a radio communication device that performs channel estimation more than once using a plurality of pilot symbols inserted at predetermined intervals by a pilot symbol insertion unit into a received data sequence comprising a channel estimation unit configured to perform the channel estimation using the pilot symbols, a storage unit configured to store a plurality of estimated values obtained by the channel estimation unit, a determination unit configured to compare the estimated values stored in the storage unit, calculate an amount of change of the estimated values, and determine whether the amount of change of the estimated values is within a preset threshold range, and a notification unit configured to notify the pilot symbol insertion unit of a determination result of the determination unit.

To attain the above object, according to a third aspect of the present invention, there is provided a radio communication device that performs channel estimation more than once using a plurality of pilot symbols inserted at predetermined intervals by a pilot symbol insertion unit into a received data sequence, comprising a channel estimation unit configured to perform the channel estimation using the pilot symbols, a storage unit configured to store a plurality of estimated values obtained by the channel estimation unit, a determination unit configured to compare the estimated values stored in the storage unit and determine an amount of change of the estimated values, and a request unit configured to request the pilot symbol insertion unit to adjust the intervals when inserting the pilot symbols according to the amount of change of the estimated values.

To attain the above object, according to a fourth aspect of the present invention, there is provided a radio communication device that performs channel estimation more than once using a plurality of pilot symbols inserted at predetermined intervals by a pilot symbol insertion unit into a received data sequence, comprising a channel estimation unit configured to perform the channel estimation using the pilot symbols, a storage unit configured to store a plurality of estimated values obtained by the channel estimation unit, a determination unit configured to compare the estimated values stored in the storage unit and determine an amount of change of the estimated values, and an adjustment unit configured to adjust the intervals of the inserted pilot symbols according to the amount of change of the estimated values.

To attain the above object, according to a fifth aspect of the present invention, there is provided a radio communication method comprising the steps of transmitting radio signals from a transmitter including a data sequence together with a plurality of pilot symbols inserted into the data sequence at predetermined intervals, receiving the radio signals by a receiver, performing channel estimation more than once using the received pilot symbols at the receiver, storing a plurality of estimated values obtained in the channel estimation into the receiver, comparing the stored estimated values and determining an amount of change of the estimated values at the receiver, requesting the transmitter by the receiver to adjust the intervals when inserting the pilot symbols according to the amount of change of the estimated values, and adjusting the intervals in response to the request at the transmitter when inserting the pilot symbols into the data sequence.

To attain the above object, according to a sixth aspect of the present invention, there is provided a radio communication method comprising the steps of transmitting radio signals from a transmitter including a data sequence together with a plurality of pilot symbols inserted into the data sequence at predetermined intervals, receiving the radio signals by a receiver, performing channel estimation more than once using the received pilot symbols at the receiver, storing a plurality of estimated values obtained in the channel estimation into the receiver, comparing the stored estimated values and determining an amount of change of the estimated values at the receiver, transmitting the amount of change of the estimated values from the receiver to the transmitter, and adjusting the intervals at the transmitter according to the received amount of change of the estimated values when inserting the pilot symbols into the data sequence.

These and other objects, features, and advantages of the present invention will be more apparent from the following detailed description of the preferred embodiments given with reference to the accompanying drawings.

DESCRIPTION OF THE PREFERRED EMBODIMENTS

Below, preferred embodiments of the present invention will be explained with reference to the accompanying drawings.

Figure 2:
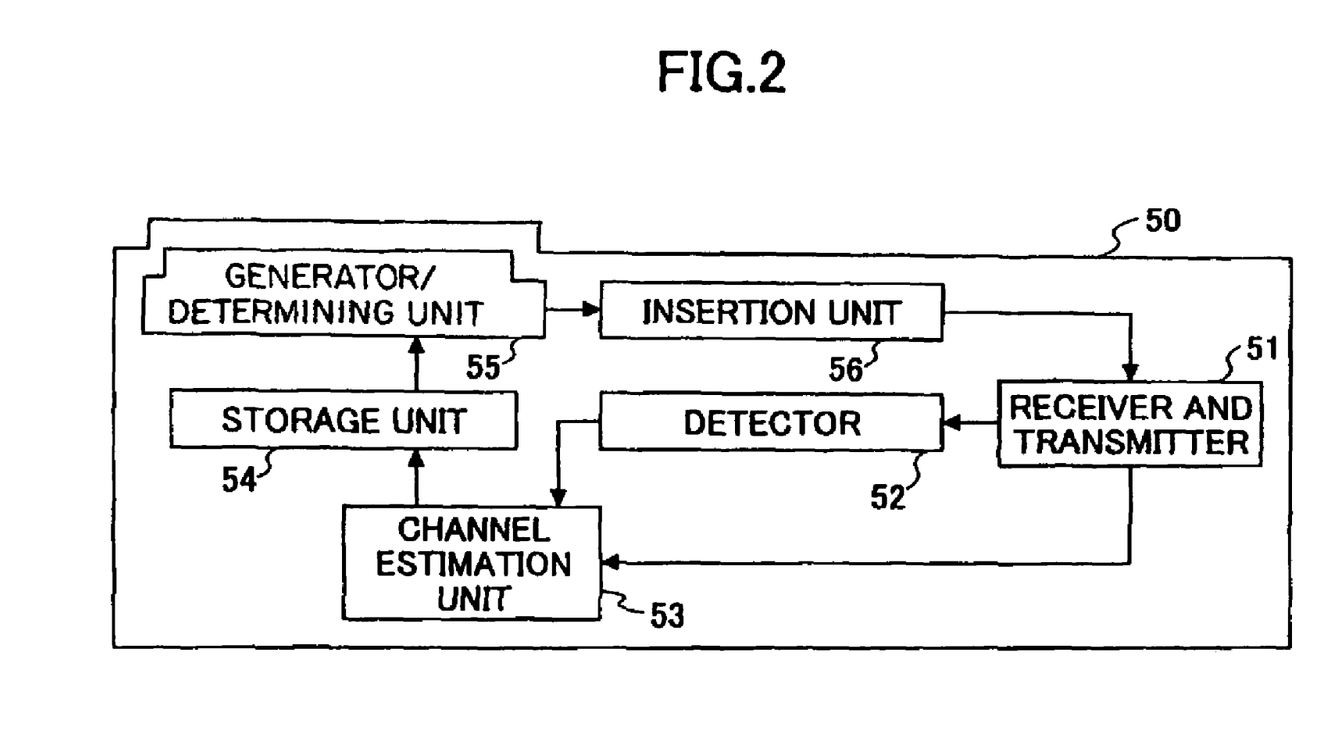
FIG. 2 is a block diagram showing an example of a configuration of a radio communication device according to an embodiment of the present invention.

FIG. 2 is a block diagram showing an example of a configuration of a radio communication device for channel estimation according to an embodiment of the present invention.

Figure 5:
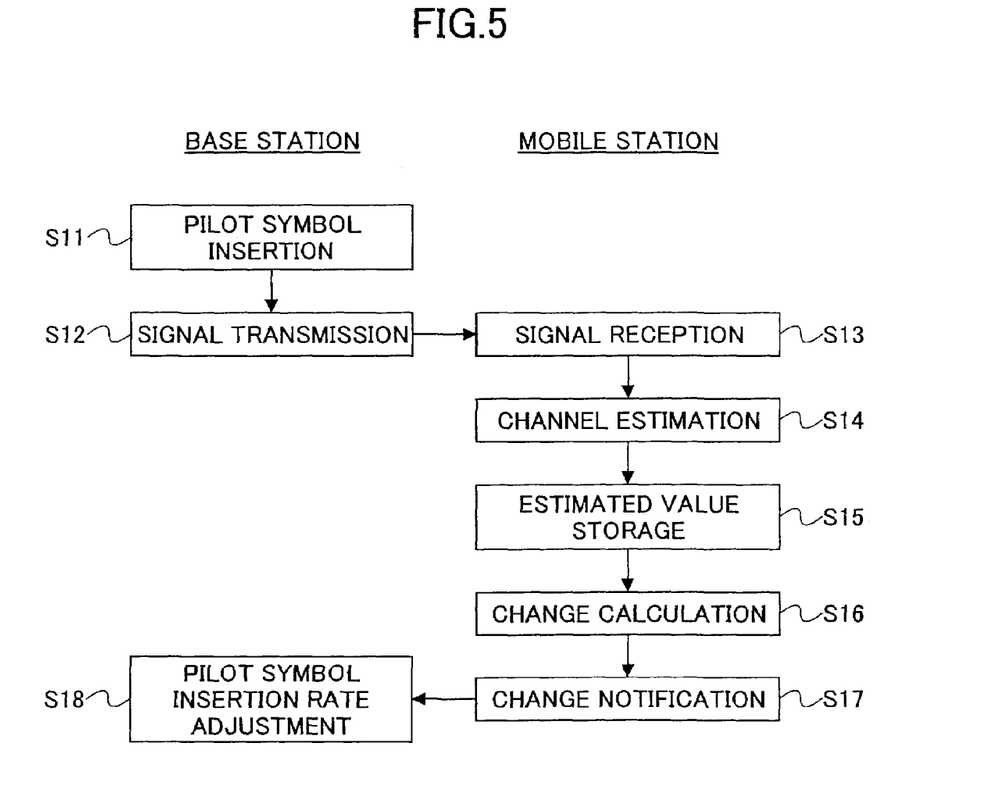
FIG. 5 is a flow chart showing a first example of the operation of the radio communication device according to the embodiment of the present invention.

The radio communication device 50 shown in FIG. 5 is installed in a base station or a mobile station. The radio communication device 50 includes a receiver and transmitter 51, and a detector 52 for detecting the period of channel estimation, a channel estimation unit 53, a storage unit 54 for storing estimated values obtained in the channel estimation, a generator 55 (i.e. a generator/determining unit) for generating a period of the pilot symbols, and an insertion unit 56 for inserting pilot symbols.

The detector 52 detects the period of channel estimation by any of known methods from control information included in signals received at the receiver and transmitter 51, and outputs the period data to the channel estimation unit 53. The channel estimation unit 53 performs channel estimation using the input period data and obtains estimated values. For example, the channel estimation unit 53 estimates amplitude variation and phase variation in the transmission channels. The thus obtained estimated values are applied to data to be transmitted and are stored in the storage unit 54. Note that a number of estimated values in previous channel estimations are also stored in the storage unit 54. At the generator 55, for example, the total or averaged variation of the previous estimated values are compared with a threshold TH, and if it is less than the threshold TH, a new pilot symbol insertion period is generated. At the insertion unit 56, based on the pilot symbol insertion period, pilot symbols are inserted in a data sequence to be transmitted by means of time multiplexing, and then the data sequence is transmitted. The new pilot symbol insertion period may be included in control data and transmitted to the receiving end to inform the receiving end of the new pilot symbol insertion period.

Figure 3:
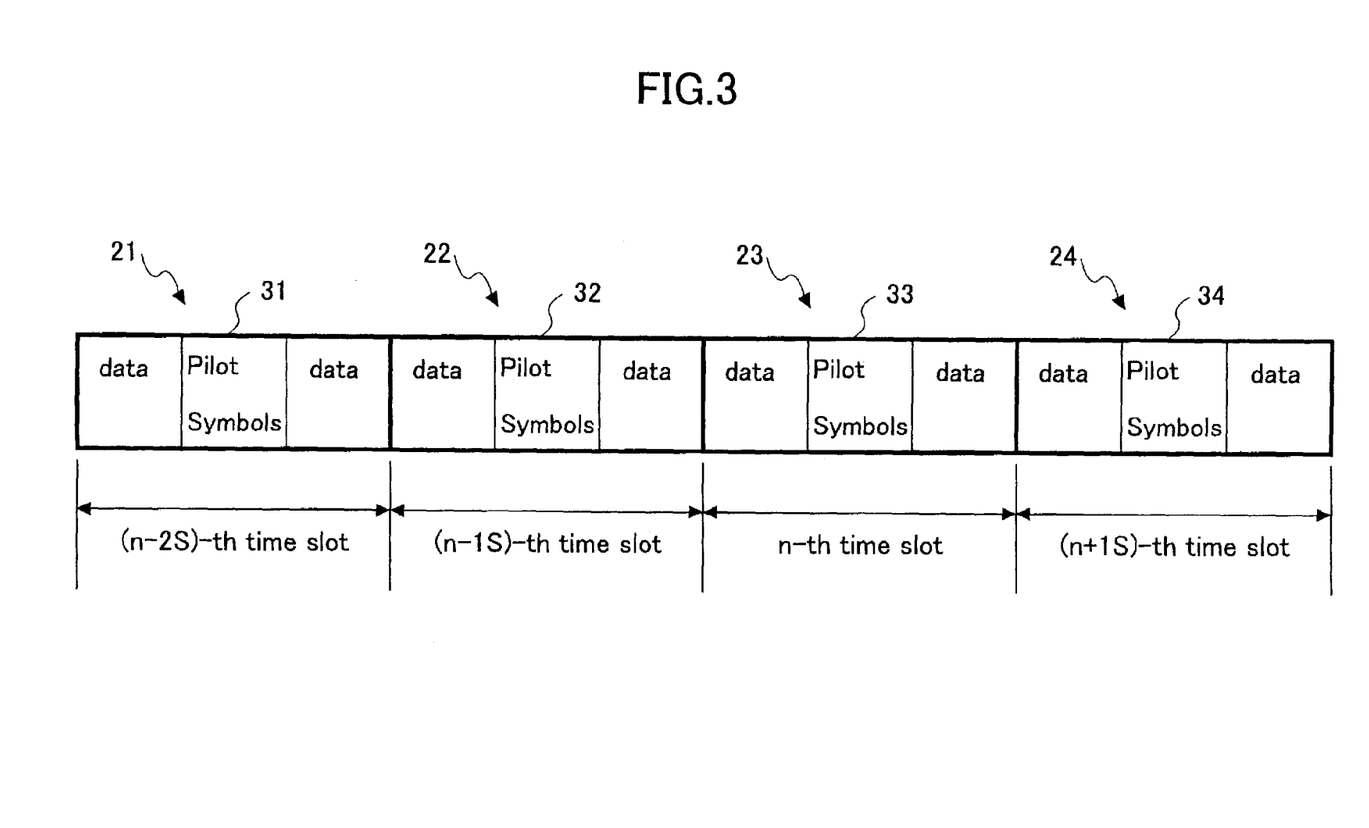
FIG. 3 is a data diagram showing pilot symbol insertion into time slots in a TDD CDMA system.

FIG. 3 is a data diagram showing in detail pilot symbol insertion into time slots in a TDD CDMA system. In FIG. 3, pilot symbols 31, 32, 33, and 34 are inserted into time slots 21, 22, 23, and 24, respectively.

A mobile station carries out channel estimation by using the pilot symbols in a time slot of its own among the pilot symbols transmitted from a base station. On the other hand, a base station carries out channel estimation by using the pilot symbols in a time slot of its own among the pilot symbols transmitted from a mobile station.

Figure 4:
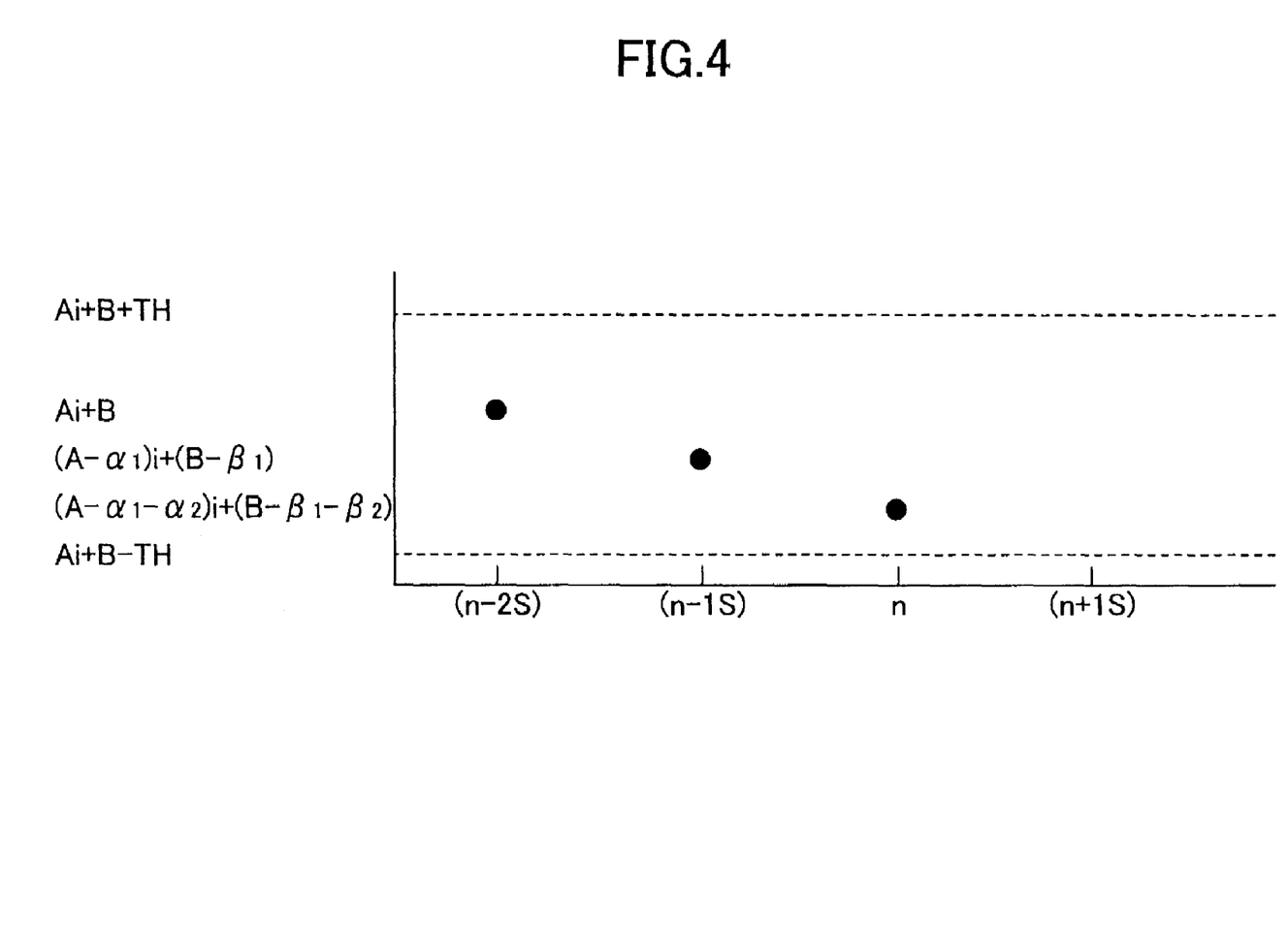
FIG. 4 is graph showing variation of estimated values obtained by channel estimation.

FIG. 4 shows variation of estimated values obtained by channel estimation. As shown in FIG. 4, suppose the period of the measurement of pilot symbols and channel estimation is S, so the value Ai+B that is estimated at time n−2S changes to $(A-\alpha_1)$ i+$(B-\beta_1)$ at time n−1S, and further changes to $(A-\alpha_1-\alpha_2)$ i+$(B-\beta_1-\beta_2)$ at time n. That is, from the time n−2S to the time n, the change of the estimated value is $-(\alpha_1+\alpha_2)$ i−$(\beta_1+\beta_2)$. This change should be within a range defined by a threshold TH set beforehand.

Further, it is possible to make the pilot symbol insertion period longer. To do that, the mobile station or the base station, which acts as a receiving end that performs channel estimation, transmits control data including the change of the pilot symbol insertion period to a base station or a mobile station, respectively, acting as a transmitting end, and thereby, the pilot symbol insertion period may be increased, for example, from the present value S to S+1, or S+2. Accordingly, at the transmitting end (that is, the side where the pilot symbols are inserted), the pilot symbol insertion period is set longer, and as a result, it becomes possible to use portions of a slot, where pilot symbols are inserted so far, to allocate data. Because at the receiving end, channel estimation is performed with a longer period, the estimated values are applicable to more data. For example, in FIG. 3, insertion of the pilot symbols 32 and 34 may be omitted, and the places for the insertion may be used to allocate data.

On the other hand, it is also possible to make the current period shorter, for example, from S to S−1, or S−2, or even shorter, when the change of the estimated value in one period or a number of periods exceeds the threshold TH. Therefore, because the pilot insertion period can be shortened at the transmitting end (that is, the side where the pilot symbols are inserted), the channel estimation can be performed with a shorter period at the receiving end, and the precision of the channel estimation can be improved.

FIG. 5 is a flow chart showing a first example of the operation of the radio communication device 50 according to the embodiment of the present invention.

In step S11, a base station inserts a plurality of pilot symbols into a data sequence at certain intervals.

In step S12, the base station transmits the radio signals including the data sequence together with the inserted pilot symbols.

In step S13, a mobile station receives the radio signals.

In step S14, the mobile station demodulates the received signals, obtains the pilot symbols from the received signals, and performs channel estimation more than once using the received pilot symbols.

In step S15, the mobile station stores a plurality of estimated values obtained in the channel estimation.

In step S16, the mobile station compares the stored estimated values and determines the change of the estimated values.

In step S17, the mobile station notifies the base station of the change of the estimated values.

In step S18, the base station adjusts the pilot insertion period according to the change of the estimated values.

Figure 6:
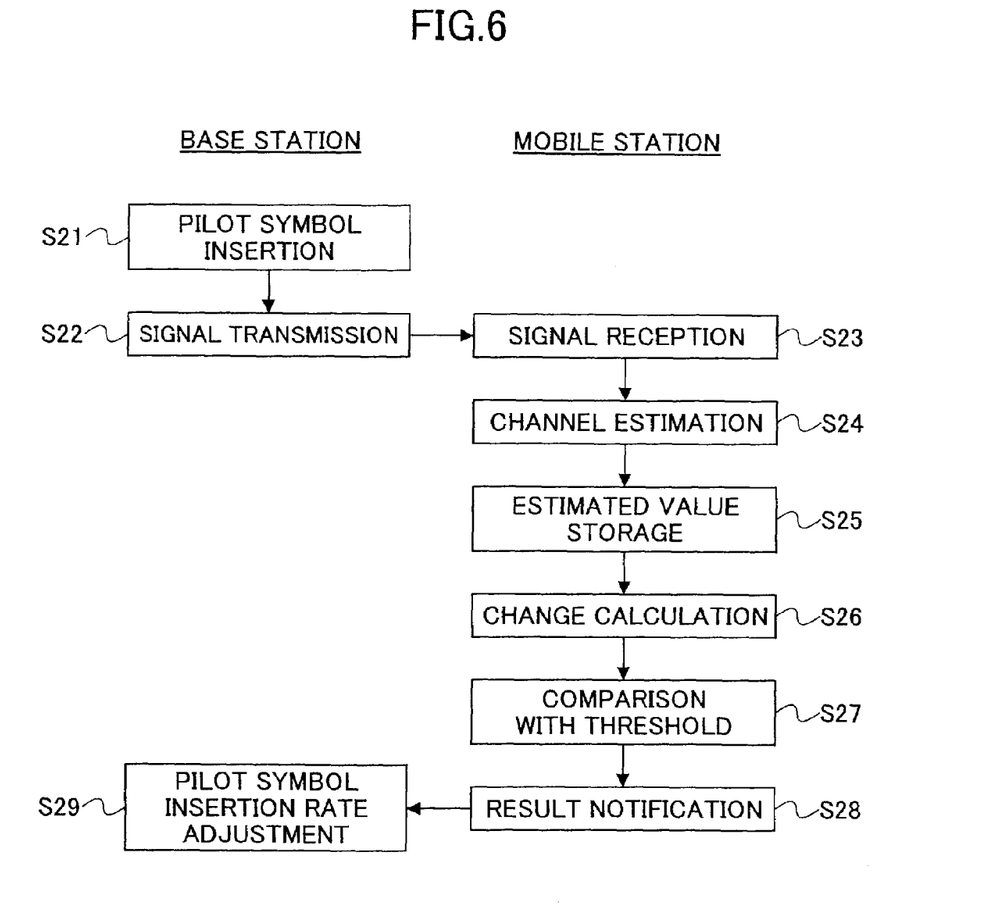
FIG. 6 is a flow chart showing a second example of the operation of the radio communication device according to the embodiment of the present invention.

FIG. 6 is a flow chart showing a second example of the operation of the radio communication device 50 according to the embodiment of the present invention.

In step S21, a base station inserts a plurality of pilot symbols into a data sequence at certain intervals.

In step S22, the base station transmits the radio signals including the data sequence together with the inserted pilot symbols.

In step S23, a mobile station receives the radio signals.

In step S24, the mobile station demodulates the received signals, obtains the pilot symbols from the received signals, and performs channel estimation more than once using the received pilot symbols.

In step S25, the mobile station stores a plurality of estimated values obtained in the channel estimation.

In step S26, the mobile station compares the stored estimated values and calculates the change of the estimated values.

In step S27, the mobile station compares a preset threshold value TH with the change of the estimated values, and determines whether the change is within the range of the threshold TH.

In step S28, the mobile station notifies the base station of the result of determination whether the change is within the range of the threshold TH.

In step S29, the base station adjusts the pilot insertion period according to the results of the determination.

Figure 7:
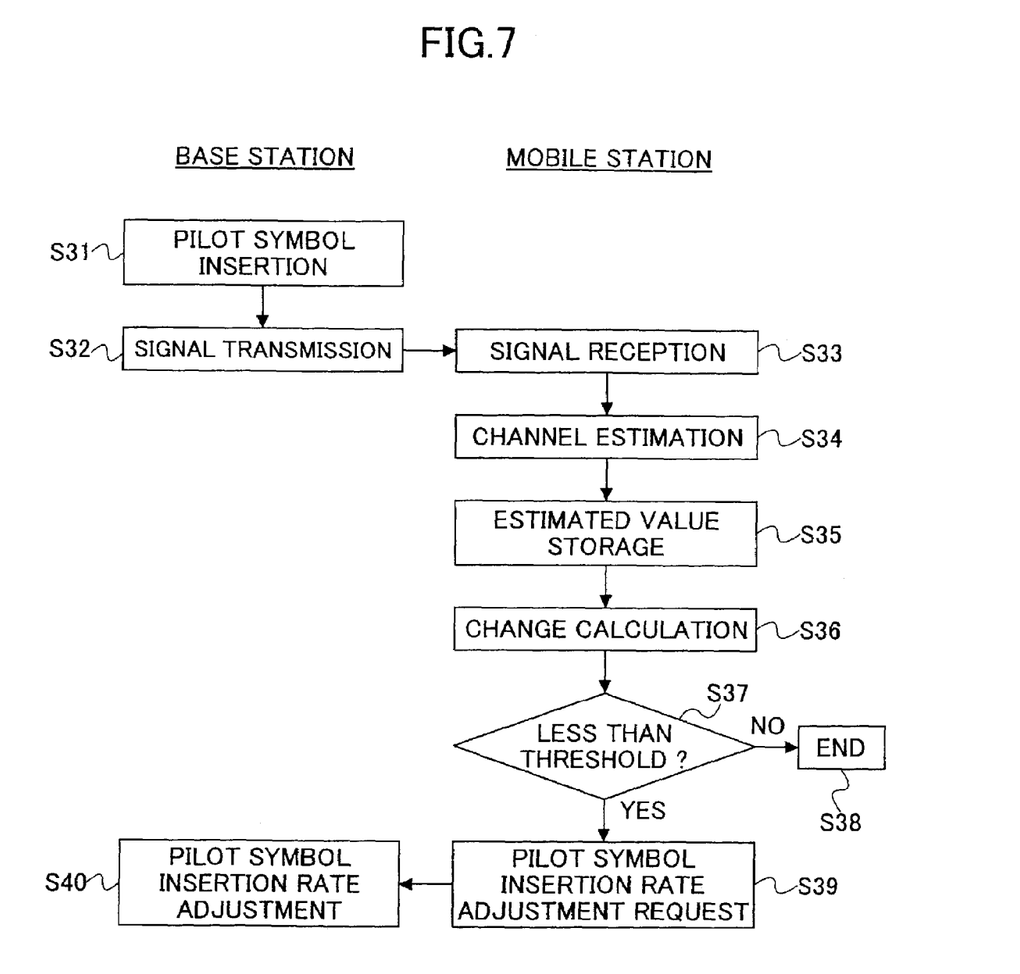
FIG. 7 is a flow chart showing a third example of the operation of the radio communication device according to the embodiment of the present invention.

FIG. 7 is a flow chart showing a third example of the operation of the radio communication device 50 according to the embodiment of the present invention.

In step S31, a base station inserts a plurality of pilot symbols into a data sequence at certain intervals.

In step S32, the base station transmits the radio signals including the data sequence together with the inserted pilot symbols.

In step S33, a mobile station receives the radio signals.

In step S34, the mobile station demodulates the received signals, obtains the pilot symbols from the received signals, and performs channel estimation more than once using the received pilot symbols.

In step S35, the mobile station stores a plurality of estimated values obtained in the channel estimation.

In step S36, the mobile station compares the stored estimated values and calculates the change of the estimated values.

In step S37, the mobile station compares a preset threshold value TH with the change of the estimated values, and determines whether the change is within the range of the threshold TH.

In step S38, if the change is outside the range of the threshold TH, the routine is finished.

In step S39, if the change is within the range of the threshold TH, the mobile station requests the base station to adjust the pilot insertion period.

In step S40, the base station adjusts the pilot insertion period according to the request.

Figure 8:
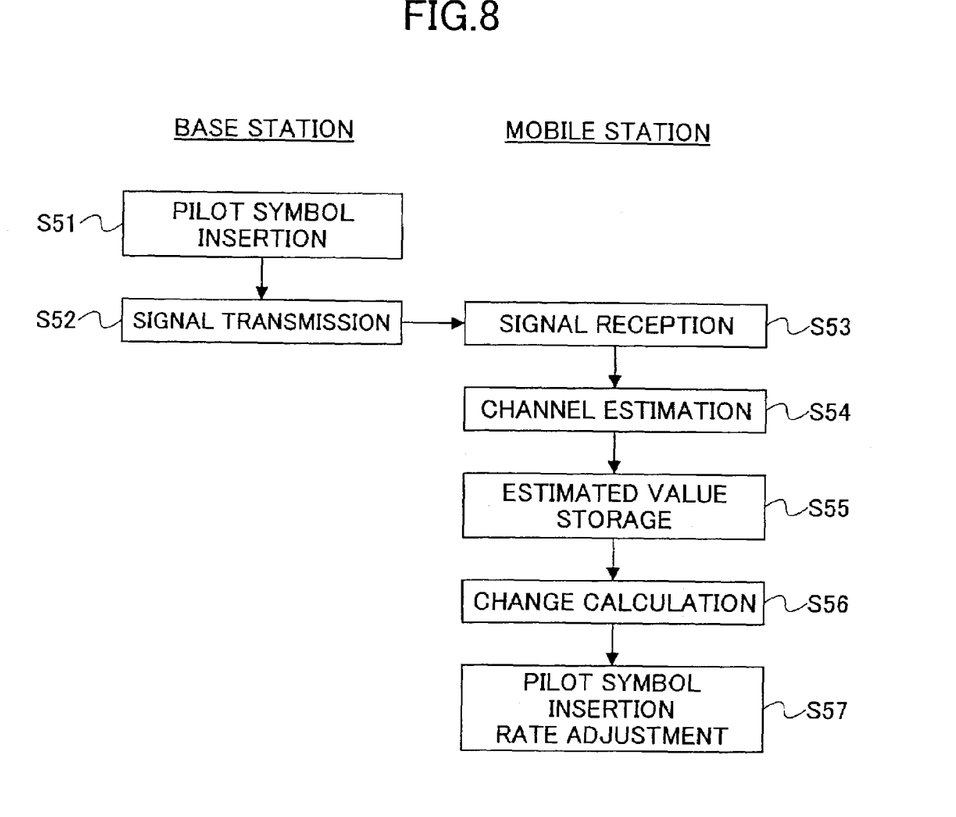
FIG. 8 is a flow chart showing a fourth example of the operation of the radio communication device according to the embodiment of the present invention.

FIG. 8 is a flow chart showing a third example of the operation of the radio communication device 50 according to the embodiment of the present invention.

In step S51, a base station inserts a plurality of pilot symbols into a data sequence at certain intervals.

In step S52, the base station transmits the radio signals including the data sequence together with the inserted pilot symbols.

In step S53, a mobile station receives the radio signals.

In step S54, the mobile station demodulates the received signals, obtains the pilot symbols from the received signals, and performs channel estimation more than once using the received pilot symbols.

In step S55, the mobile station stores a plurality of estimated values obtained in the channel estimation.

In step S56, the mobile station compares the stored estimated values and calculates the change of the estimated values.

In step S57, the mobile station adjusts the pilot insertion period by it self according to the change.

In the embodiment described above, the transmitting end (for example, the base station), where the pilot symbols are inserted, makes the determination whether the change of the estimated values of the signals transmitted from the party of the transmitting end, for example, the mobile station, is within the range of the threshold value TH; of course, this determination may also be made at the receiving end (for example, the mobile station), and the receiving end may transmit the result of the determination to the transmitting end (for example, the base station).

Alternatively, it is also possible that the receiving end notifies the transmitting end of the change of the estimated values obtained at the receiving end, and the transmitting end makes the determination whether the change of the estimated values of the signals is within the range of the threshold value TH, then the transmitting end modifies the pilot symbol insertion period according to uses of this information.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, when the propagation environment changes slowly and hence the change of the channel estimation over multiple slots becomes small, unnecessary pilot symbols for channel estimation are reduced, so more data bits can be transmitted. In this way, efficient data transmission is achieved. On the other hand, when the propagation environment changes rapidly, and the change of the channel estimation over multiple slots becomes large, the pilot symbols for channel estimation are increased to secure precision of channel estimation. In this way, efficient channel estimation is achieved.

This patent application is based on Japanese priority patent application No. 2002-136064 filed on May 10, 2002, the entire contents of which are hereby incorporated by reference.

What is claimed is:

1. A channel estimation device that performs channel estimation more than once using a plurality of pilot symbols inserted at predetermined intervals by a pilot symbol insertion unit into a received data sequence, comprising:
   a channel estimation unit configured to perform the channel estimation using the pilot symbols;
   a storage unit configured to store a plurality of estimated values obtained by the channel estimation unit;
   a determination unit configured to compare the estimated values stored in the storage unit and determine an amount of change of the estimated values, said change of the estimated values being used for adjusting the intervals of the inserted pilot symbols.

2. The channel estimation device as claimed in claim 1, wherein
   the determination unit further determines whether the amount of change of the estimated values is within a preset threshold range, and notifies the pilot symbol insertion unit of a determination result.

3. The channel estimation device as claimed in claim 1 wherein
   the determination unit
   requests the pilot symbol insertion unit to adjust the intervals when inserting the pilot symbols according to the amount of change of the estimated values.

4. The channel estimation device as claimed in claim 1, wherein the determination unit notifies the pilot symbol insertion unit of the amount of change of the estimated values.

5. A channel estimate method comprising the steps of:
   transmitting radio signals from a transmitter including a data sequence together with a plurality of pilot symbols inserted into the data sequence at predetermined intervals;
   receiving the radio signals by a receiver;
   performing channel estimation more than once using the received pilot symbols at the receiver;
   storing a plurality of estimated values obtained in the channel estimation into the receiver;
   comparing the stored estimated values and determining an amount of change of the estimated values at the receiver, and
   adjusting the intervals based on the change of the estimated values at the transmitter when inserting the pilot symbols into the data sequence.

6. The channel estimate method as claimed in claim 5, wherein
   the receiver transmits change of the estimated values to the transmitter; and
   the transmitter adjusts the intervals according to the received amount of change of the estimated values when inserting the pilot symbols into the data sequence.

7. The channel estimate method as claimed in claim 5, wherein the receiver requests the transmitter to adjust the intervals when inserting the pilot symbols according to the amount of change of the estimated values.

8. The channel estimate method as claimed in claim 5, wherein the receiver determines whether the amount of change of the estimated values is within a preset threshold range.

9. A channel estimation system, comprising:
   a pilot symbol insertion unit that inserts a plurality of pilot symbols at intervals into a data sequence;
   a channel estimation unit configured to perform channel estimation more than once using the pilot symbols;
   a storage unit configured to store a plurality of estimated values obtained by the channel estimation unit;
   a determination unit configured to compare the estimated values stored in the storage unit and determine a change of the estimated values; and
   a pilot symbol insertion interval adjustment unit configured to adjust the intervals of inserting the pilot symbol based on the change of the estimated values, the pilot symbol insertion unit inserting the pilot symbols at the adjusted intervals into the data sequence.

* * * * *